United States Patent [19]

East

[11] Patent Number: 5,197,592
[45] Date of Patent: Mar. 30, 1993

[54] WIRE FRAME IDLER ROLL SUPPORT
[75] Inventor: Charles F. East, Van Fleet, Miss.
[73] Assignee: FMC Corporation, Chicago, Ill.
[21] Appl. No.: 740,750
[22] Filed: Aug. 5, 1991
[51] Int. Cl.5 .............................. B65G 15/08
[52] U.S. Cl. .................................. 198/830
[58] Field of Search ........................ 198/828, 830

[56] References Cited
U.S. PATENT DOCUMENTS 2,095,444 10/1937 Kendall ................................ 198/830
3,087,601 4/1963 Lo Presti ............................ 198/828
3,273,695 9/1966 Hamaker et al. .................... 198/828
5,044,490 9/1991 East .................................... 198/830

Primary Examiner—Joseph E. Valenza
Attorney, Agent, or Firm—Douglas W. Rudy; Lawrence Cruz; Richard B. Megley

[57] ABSTRACT

A support frame for use in supporting a plurality of idler rolls has separate compression and tension support members each extending across the length of the support frame and attached to center brackets for supporting the idler rolls. The support members are rod-shaped having similar width and thickness dimensions.

9 Claims, 2 Drawing Sheets

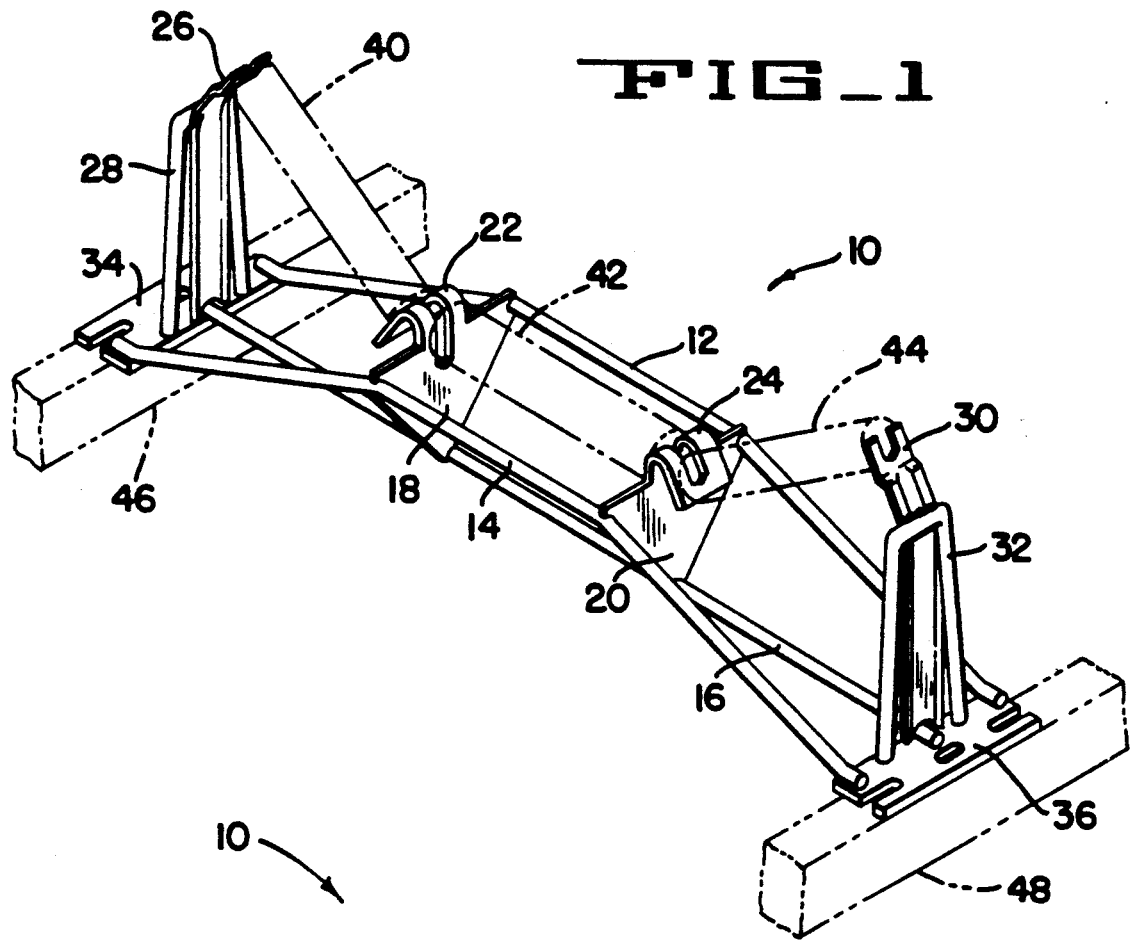
FIG_1
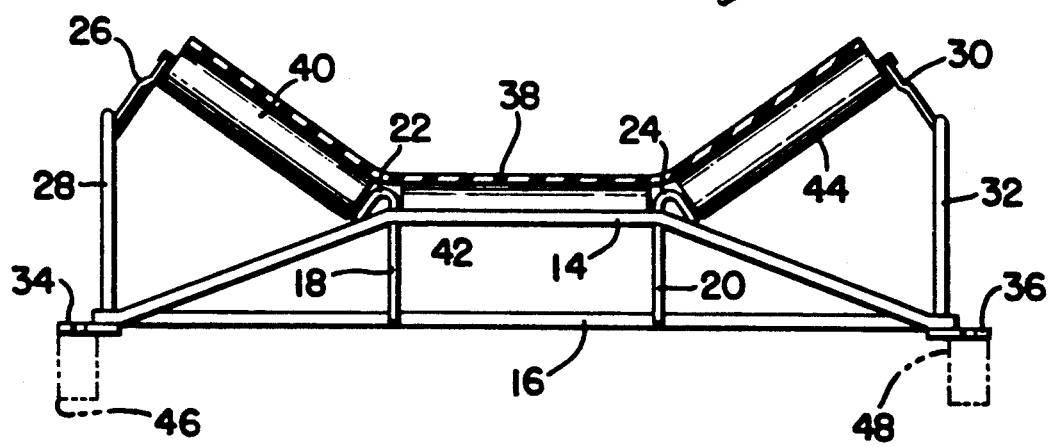
FIG_2

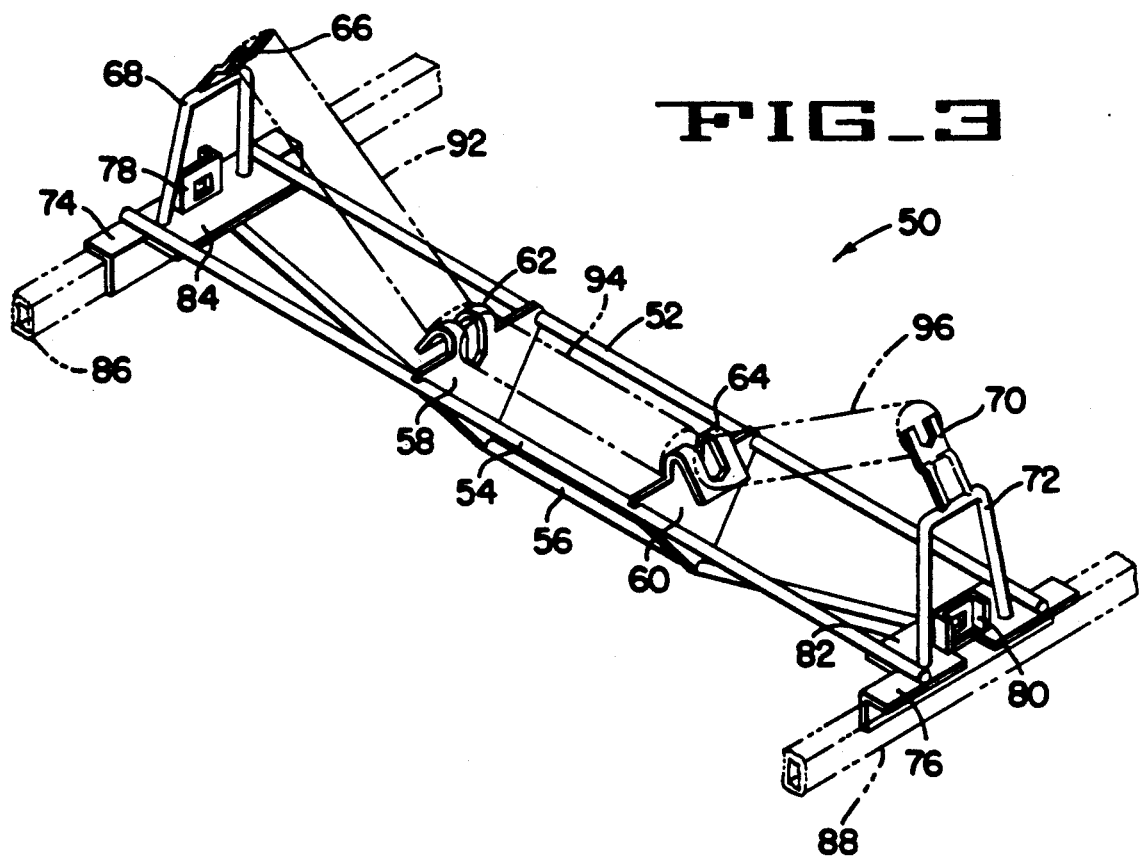
FIG_3
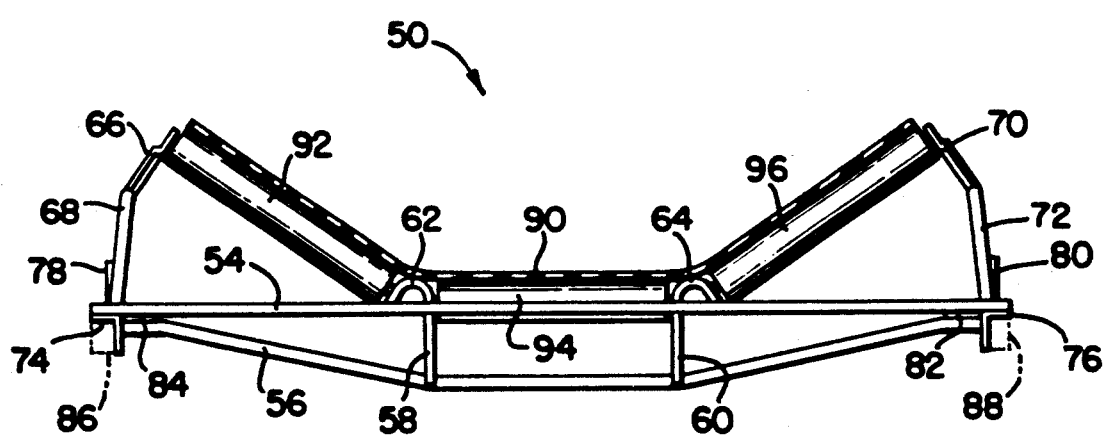
FIG_4

WIRE FRAME IDLER ROLL SUPPORT

This invention has to do with a support frame for use in supporting a plurality of idler rolls. The idler rolls normally support a conveyor belt of the type used in mining and quarry operations where bulk material, such as coal or gravel, may be transported by a conveyor belt to a holding or processing site.

Support frames of this genre have traditionally been fabricated from sections of structural metal angles and plates. The resulting "idler frame", as such a support is known, is generally a relatively bulky device having significant weight in order to give the idler frame the durability to be "knocked around" in its environment without incurring damage. Furthermore, the significant number of planar surfaces in prior art idler frames provided a large surface area upon which material and debris would accumulate over time.

Often idler frames will be used to support conveyors in a transient situation such as an underground coal mine. In this situation the conveyor is frequently moved to keep up with the coal face and thus the idler frames have to be moved periodically. It would be advantageous to have such idler frames as light as possible while still maintaining excellent strength characteristics. Also, a lack of buildup of material and debris on the frame results in a smoother, cleaner disassembly of the conveyor system. To accomplish this objective the instant invention has been invented. The wire frame idler roll support, or wire idler frame is a lightweight structurally significant replacement for heavier plate and angle iron idler frames currently on the market. The advantages, such as, but not limited to, lightweight and minimal surface area upon which material can accumulate, of the wire idler frame will become apparent upon reading the following disclosure in connection with the drawing figure in which:

FIG. 1 is a projected view of one embodiment of the idler frame;

FIG. 2 is an elevation view of the idler frame shown in FIG. 1;

FIG. 3 is a projected view of another embodiment of an idler frame; and

FIG. 4 is an elevation view of the idler frame of FIG. 3.

DETAILED DESCRIPTION OF THE DRAWING FIGURES

One embodiment of the invention, what is known as an above ground configuration idler frame, is shown in FIGS. 1 and 2. This configuration would be used in overland conveyor situations. This is not to say that it couldn't be used underground but it is believed that the embodiment shown in FIGS. 3 and 4, a below ground idler frame configuration is more easily used underground due to its lower overall height.

Returning to FIG. 1 a symmetrical device is shown with each end of the idler frame, generally 10, having mounting pads 34 and 36. The mounting pads are elongated flat stock elements that may be provided with an assortment of slots and holes to allow attachment of the idler frame 10 to support means such as 46 and 48.

Fastened to, typically in a preferred embodiment, by means of welding, are first 12 and second 14 compression members. One of each of said compression members is on each side of a lateral center line, generally described by a tension member 16. The compression members extend from each mounting pad, normally the top side thereof, to the other mounting pad at the opposite end of the idler frame. The project upwardly from the mounting pads until reaching a central zone of the idler frame where each of the compression members extends horizontally to meet with the upwardly directed opposite end of the compression member. The side elevation view of the above ground configuration of the idler frame, that is FIG. 2, clearly shows the shape of the compression member(s) 14 (and 12). In the preferred embodiment these compression members are of round solid stock but could be of different cross sectional shape and configurations (such as tubing).

The tension member 16 in this FIG. 1 embodiment is a generally straight rod that is aligned along the longitudinal center line between, and connected to each of the mounting pads 34 and 36. These three elements, the two compression members 12 and 16 and the tension member 16 as well as the mounting pads 34 and 36 are the main longitudinal structural elements of the idler frame. But the idler frames purpose is to support idler rolls, wing rolls 40 and 44, and center roll 42. These idler rolls—unpowered, freewheeling rolls—are supported at each of the rolls by various roll axle receiving means.

The ends, or more properly the axle, of the center roll 42 are supported in slots in center brackets 18 and 20. The center brackets 18 and 20 are important structural elements as they are in contact with and may even be fastened, as by welding, to the two compression members and the tension member.

The left hand, arbitrarily, center bracket 18 and the right hand, center bracket 20 are mirror images of each other. Both are generally triangular flat plate pieces having an extended projection that is perforated with a long slot and is then bent over toward the respective right and left mounting pads as clearly shown in the drawing figures.

The center brackets are spaced apart to accommodate the length of the center roll and are generally fixed to the compression members 12 and 14 at the transition zones where each of the compression members is generally horizontal rather than upwardly sloped.

For convenience in attaching the center brackets to the compression members and the tension member the "corners" of the center brackets may be formed with complimentary indentations to receive the compression and tension members.

The bent over extended projections, 22 and 24 can accommodate, in the generally vertical portion of the elongated slot, the axle ends of the center roll. The bent over portions, with the continuation of the elongated slots, accommodate the inboard ends of the axle of the wing rolls 40 and 44. The angle to which the bent over tabs are bent is that angle that best serves to accommodate the inboard axle end of the wing rolls 40 and 44.

The outboard ends or axle ends of the rolls 40 and 44 are supported in wing roll support brackets—a left one being 26 and a right end one being 30. These wing roll support brackets are generally upstanding stamped metal or formed plates that are attached at their bases, in this embodiment, to the mounting pads 34 and 36. Further support to the upstanding end bracket plates 26 and 30 is provided by bent rod or wire end bracket supports 28 and 32. These wire end brackets are fastened, preferably by welding, to the mounting pads 34 and 36 and to the end bracket plates as shown in FIG. 1. The wing rolls 40 and 44 are thus supported at each axle end thereof in respective bent over portions of the center brackets 22 and 24 and the slots in the end brackets 26 and 30.

As can be seen in FIG. 2 a conveyor, shown in cross section as 38, is then accommodated on the set of three rolls as shown. A plurality of roll support frames and rolls are used to support a run of continuous conveyor as can be envisioned to move bulk materials from one location to another.

An alternative embodiment of the wire frame idler roll support, this embodiment used for underground or below ground level frames.

This embodiment is similar to the embodiment discussed above however is different in detail while retaining the advantages of low weight and open spaces between components.

In the FIG. 3 and FIG. 4 embodiment the wire frame idler roll support generally 50 is supported on rails 86 and 88. The supports for the frame are structural angles 74 and 76 which include extensions 84 and 82. Clamp brackets 78 and 80 are also affixed or otherwise formed on the structural angles as shown in FIG. 3.

The tension members 52 and 54 are generally rods that extend straight from a left side structural frame 74 (in the area of the extension 84) to a right side structural angle 76 (again in the area of the extension). Aligned generally along the transverse center line of the frame is a compression member 56 that extends from the left side structural angle 74 to a right side structural angle 76. This compression member 56 is fastened, preferably by welding, to the bottom side of each structural angle. The central portion, that portion generally under the center roll 94 is displaced downwardly from a horizontal plane as shown in FIG. 4.

The center brackets 58 and 60 are similar to those shown in FIGS. 1 and 2 in that they are triangular in shape with a bent over and slotted projection, 62 and 64 respectively. They are attached at the bottom "point" of the triangle to the compression member 56 and at the side points to the tension members 52 and 54.

Clamp brackets 78 and 80 are provided to allow clamps, normally of a temporary attachment type, to fasten the structural angles to the supports 86 and 88. These clamps could be easily removable so that the wire frame could be easily moved, set up and taken down.

Upstanding wire trestles 68 and 72 provide means to support the end bracket plates 66 and 70. These end bracket plates 66 and 70 are welded or otherwise affixed to the top horizontal surface of the wire trestles to provide a mounting location for the outboard ends of the wing rolls 92 and 96. The trestle legs are welded or otherwise attached to the structural angles 74 and 76 in a generally vertical upright configuration.

As shown in FIG. 4 the continuous conveyor belt 90 is positioned over the rollers and in the company of multiple wire idler support frames provides a path for the belt to follow.

Thus it can be seen that there has shown and described a pair of frames, each somewhat different from the other, for supporting idler rolls in a conveyor system that supports a continuous conveyor belt. The following claims attempt to claim the broad concept of the invention and nuances of design are believed to be within the scope of these claims.

What is claimed is:

1. An idler roll supporting frame for supporting a plurality of idler rolls, the improvement comprising:
   a compression member comprising a first rod-like member extending from one end of said idler roll supporting frame to a second end of said idler roll supporting frame and having a width dimension similar to the dimension of its thickness;
   a tension member comprising a second rod-like member;
   center brackets attached to said compression member and to said tension member;
   means provided on said center brackets to support said idler rolls.

2. The invention in accordance with claim 1 wherein said idler roll supporting frame includes more than one compression member.

3. The invention in accordance with claim 2 wherein said tension member extends from one end of said idler roll supporting frame to a second end of said idler roll supporting frame.

4. The invention in accordance with claim 3 wherein each of said compression members is affixed to mounting pads spaced apart from each other at the ends of said idler roll supporting frame.

5. The invention in accordance with claim 4 wherein each of said compression members extends above a horizontal plane described by said tension member.

6. The invention in accordance with claim 1 wherein said idler roll supporting frame includes more than one tension member.

7. The invention in accordance with claim 6 wherein each of said tension members extends from one end of said idler roll supporting frame to a second end of said idler roll supporting frame.

8. The invention in accordance with claim 7 wherein each of said tension members is affixed to mounting pads spaced apart from each other at the ends of said idler roll supporting frame.

9. The invention in accordance with claim 8 wherein said compression member extends below a horizontal plane described by said tension members.

* * * * *